United States Patent [19]
Mudd

[11] Patent Number: 5,507,991
[45] Date of Patent: Apr. 16, 1996

[54] EXTRUSION METHOD FOR PRODUCING FD&C DYES

[76] Inventor: John R. Mudd, 602 Westborough, Webster Groves, Mo. 63119

[21] Appl. No.: 324,750

[22] Filed: Oct. 18, 1994

[51] Int. Cl.⁶ .................................................. B29C 47/12
[52] U.S. Cl. ................................ 264/143; 264/211.12
[58] Field of Search .......................... 264/70, 140, 143, 264/211.2, 211.12

[56] References Cited

U.S. PATENT DOCUMENTS

| | | | |
|---|---|---|---|
| 2,403,476 | 7/1946 | Berry et al. | |
| 3,447,486 | 6/1969 | Wooding | |
| 3,865,918 | 2/1975 | Mitchell et al. | 264/188 |
| 4,285,692 | 8/1981 | Schiwy et al. | 8/499 |
| 4,324,748 | 4/1982 | Hatakeyama et al. | 264/51 |
| 4,331,623 | 5/1982 | Zurkoff et al. | 264/140 |
| 4,388,078 | 6/1983 | Thomas et al. | 8/526 |
| 4,446,086 | 5/1984 | Molenar et al. | 264/118 |
| 4,961,755 | 10/1990 | Bruttel et al. | 8/526 |
| 5,017,195 | 5/1991 | Satou et al. | 8/526 |
| 5,030,244 | 7/1991 | Neumann et al. | 8/526 |

FOREIGN PATENT DOCUMENTS 1584519  12/1969  France .

*Primary Examiner*—Robert B. Davis
*Attorney, Agent, or Firm*—Bryan Cave

[57] ABSTRACT

A solution of substantially pure, chemically synthesized food dye is converted to a dustless and abrasion-resistant granular composition of high physical integrity which dissolves readily when intended for use. The conversion is accomplished by subjecting the dye to sequential processing operations including spray drying, mixture with water and extrusion under controlled rate and pressure. Optional, albeit preferred additional procedures include drying the product under controlled temperature following extrusion and vibration sifting the product following drying to obtain granules of approximate uniform size prefatory to packaging.

21 Claims, 1 Drawing Sheet

EXTRUSION METHOD FOR PRODUCING FD&C DYES

BACKGROUND OF THE INVENTION

1. Field of the Invention

This invention relates to a development in the production of dyes and, more particularly, to a development in the production of dustless FD&C dyes of high tinctorial character.

2. Description of the Related Art

The use of coloring agents in imparting or modifying the color of textiles, materials and foods dates back many thousands of years. These agents have come to be known as "dyes." Dye extracts have been obtained from both animals and plants. For example, cochineal is a bright red dye which, for centuries, has been extracted from the female *Coccus cacti* species of beetles indigenous to Central and South America and Mexico. Other dyes, such as indigo or "royal blue" which many regard as the world's oldest and most highly coveted dye, derive from plant life commonly found in India and South America.

The safety of dyes, particularly as used in foods, came into critical focus beginning in the early nineteenth century. It was at this time in history when foods such as pickles were colored with poisonous copper sulfate and candy was colored with toxic salts of lead and copper. In addition, a desirably darker color was commonly being imparted to tea leaves using deleterious lead-based compounds.

Synthetic creation of dyes led to the development of stronger and more stable dye compositions. Beginning in 1886, the United States began formulating policy governing the manufacture of dyes intended for use in foods. Subsequent legislation followed in 1907, 1938 and most recently in 1960 with the enactment of the Color Additive Amendment.

A component of this law required that long-term chronic feeding studies be conducted in at least two animal species. Further, the United States Food and Drug Administration (FDA) ordered dye manufacturers to submit representative samples of their products for evaluation. Based upon the results of these tests, the FDA formulated dye manufacturing standards and specifications and permanently approved for use in foods, drugs and cosmetics the following seven dyes: Red 40; Yellow 5; Yellow 6; Blue 1; Blue 2; Red 3; and Green 3. Dyes that comply with such standards and specifications are known as FD&C dyes.

To ensure compliance with the specifications so formulated, the FDA now requires FD&C dye manufacturers to submit for laboratory evaluation a 4 ounce sample from every batch of food dye produced. It is unlawful to sell any fraction of the batch prior to receiving FDA approval.

Synthetic dyes are both produced and most commonly used in solution form. Despite this, however, they generally pass as staple articles of commerce in dry powder form. The batch samples forwarded for approval to the FDA must also be submitted in dry powder form.

The use of FD&C dyes in food products, while commercially practical and feasible, can be readily characterized as a messy operation. In fact, during transportation, handling and use, it is invariable that microparticulate dye powders disperse in the vicinity of the operation. Airborne color dust is also very common and has a very high potential for cross-contaminating the other products of the user as well as his/her offices, warehouses and related operations facilities.

Thus, efforts have been made in the art to develop less dusty dyes in order to prevent product cross-contamination and to reduce the time and expense incident to clean-up.

The prevailing industry trend toward developing a less dusty dye powder has been in the direction of granulation. Until now, however, granulation development has been largely unsuccessful due to the inability to make a substantially dustless and abrasion-resistant granular dye that dissolves readily when intended for use.

Following chemical synthesis of a dye, the solution must be dried and further processed to form a granular powder product. Accordingly, the dustiness of the finished product bears relation to both the method of drying and the granulation process. Three methods are known for drying FD&C dye solutions to produce granular powders. They are tray drying, spray drying followed by compaction milling and agglomeration followed by fluid bed drying.

Tray drying is, perhaps, the oldest known method of drying FD&C color solutions. In accordance with this method, a purified filter cake or concentrated color solution is first obtained by filtration of the chemically synthesized dye solution. The cake or solution is then placed in a shallow tray and dried in a conventional walk-in oven for approximately 48 hours at a temperature of 200°–250° F. Thereafter, a hard, dry cake is recovered from the oven and subjected to a grinding and screening/sifting operation. Coarse particles must be re-ground while fine particles are sold as powder and mid-sized particles are sold as granules. Tray drying fails to produce a desirable granular dye. Rather, a substantial component of the product yield is in the form of powdery dust that cannot be cost-effectively converted to granules. Further, even the granular product that can be produced is substantially prone to disintegration through abrasion. The result is that tray-dried product that is packaged for shipment in the form of granules often reaches its destination in the form of a powdery dust that is difficult to use without significant risk of cross-product contamination and substantial clean-up implications. Tray drying is also economically unattractive due to the labor intensity of the method.

Among the most cost-effective methods of drying purified concentrated color solutions is spray drying. Because the product generated by this procedure tends to be very dusty, however, it is not suitable for many applications. In the spray-drying procedure, a compaction mill is commonly used to granulate the spray-dried color. The color composition is fed between two closely spaced high pressure rollers which physically press the powder into a sheet. The sheet composition is then subjected to grinding and sifting/screening. Fine and coarse particles are recycled back through the mill. The mid-sized particles are sold as granules. It is common that as much as 40% of the material must be recycled in order to obtain sufficient amounts of desirable granular product. Furthermore, like the tray-dried granular product, the granular product obtained by this process is also highly vulnerable to the effects of abrasion which results in the very dust and disintegration problems that granules are intended to overcome. Blended granular dyes are also difficult to produce cost-effectively in small volumes by this method.

Agglomeration coupled with fluid bed drying is yet another known drying process. In contrast to the other methods thus discussed, fluid bed drying utilizes a dry dye composition rather than a solution composition as a starting material. The process involves mixing the dry dye with concentrated color solution in a high speed mixer. The result is that enlarged or swollen wetted particles (i.e. agglomerates) are formed which are then subjected to fluid bed drying. Once dried, the particles are screened with the fine and coarse particles being recycled back again through the process. The mid-sized particles are recovered and sold as granular dyes. Like the other known drying methods, agglomeration drying produces granular dye products that readily abrade and disintegrate during handling and shipment thereby causing significant powder dust problems. Also, sufficient granular production by this method involves the recycle of up to 50% of the product. Furthermore, agglomeration drying is not feasible for manufacturing blended dyes in small volumes.

Thus, the art has lacked an effective and convenient method for treating liquid solutions of chemically synthesized FD&C dyes to produce an abrasion resistant, substantially dust-free granular dye that dissolves readily when intended for use. The invention disclosed and claimed herein achieves these advantages in a manner not revealed by the prior art.

SUMMARY OF THE INVENTION

The method and apparatus of the present invention constitute an effective and comparatively simple means for producing substantially pure, dustless and abrasion-resistant granular FD&C dyes of high tinctorial character. Accordingly, the handling and storage character of granular FD&C dyes are readily enhanced.

Both the method and adapted apparatus are simple in their manner of performance and/or operation. They utilize readily available materials and, together, represent a significant advance in the state of the art of manufacturing granular FD&C dyes.

Three salient features characterize the present invention and distinguish it from the prior art. First, the method and the apparatus of the invention yield a cohesive, uniform granular product having a physical character such that the granules will not abrade during handling and shipping. Second, the invention is cost-effective in use and third, the invention is more efficient than known methods and does not require the recycling of any appreciable amount of material.

In accordance with these features, the present invention produces a high-purity, dustless and abrasion-resistant granular dye that is convenient and economical to manufacture.

Generally, the invention comprises blending a quantity of chemically synthesized and purified dye powder with a quantity of water sufficient to create an extrudable mixture.

The mixture is then fed to an extruder where it is forced through a specially machined die under pressure and at a specified rate forming elongate, granular product strands. Following extrusion, the product strands are collected and dried conventionally for between 2–24 hours. As a final measure, the product is sifted through a vibrating screen sifter which breaks the elongate product strands into approximately uniform lengths and channels them into packaging for shipment.

Until now, efforts to produce a dry, dustless and granular FD&C dye of characteristically high physical integrity have failed due, largely, to an inability to produce granules that can withstand abrasion during processing, handling and shipment.

The process and apparatus of the present invention overcome the shortcomings of the prior art and have proven effective in manufacturing granular products having the desirable characteristics identified above, in connection with each of the seven approved FD&C dyes. Furthermore, granular dyes made in accordance with the present invention have been submitted to the FDA and certified for use in foods, drugs and cosmetics (FD&C approved).

BRIEF DESCRIPTION OF THE DRAWINGS

Further objects and features of the present invention are revealed in the following Detailed Description of the Preferred Embodiment of the invention and in the drawing figures wherein.

DETAILED DESCRIPTION OF THE PREFERRED EMBODIMENT

Figure 1:
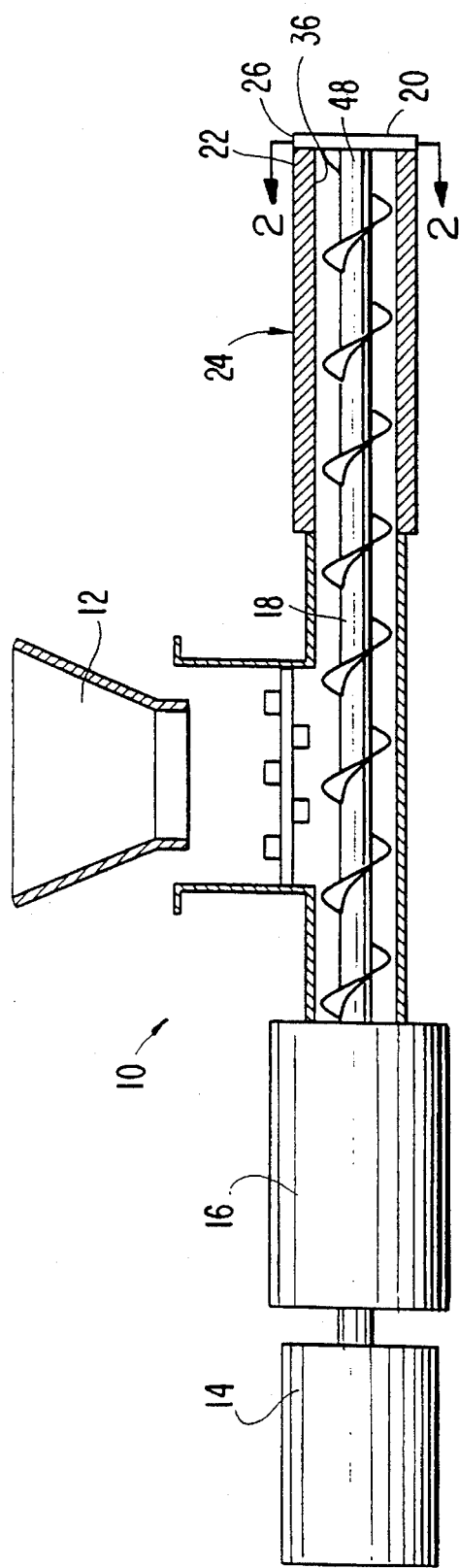
FIG. 1 is a plan view showing an extrusion apparatus of the type employed in the present invention.

In accordance with the method and adapted apparatus of this invention, drying a solution of FD&C dye to produce a powder and combining the powder with water in a relative proportion sufficient to form an extrudable mixture and extruding the mixture produces granular FD&C dyes of superior physical and chemical character. The granular product is characteristically of small diameter and high physical integrity. Furthermore, the product is substantially dustless and is readily soluble when intended for use in foods, drugs and cosmetics.

Production of the above-described granular product involves, as a preliminary but separate procedure, the synthetic production of high-purity FD&C dyes in solution and in accordance with FDA mandated specifications.

FD&C dye manufacture in solution and in accordance with the FDA specifications ensures the creation of a high-purity dye solution typically composed of at least 90% dye. The remaining 10% comprises a combination of water and salt. Given the relatively pure nature of these compositions, conventional FD&C dyes also commonly exhibit a high tinctorial strength or staining capability at even low volumes or concentrations. While the high tinctorial character of these dyes is considered desirable, it is also that feature of the product responsible for the undesirable cross-contamination of the user's other products when the product is in an uncontrollable physical state such as powder.

As explained in the foregoing background, several methods are known by which solutions of FD&C dyes of high purity and tinctorial character may be dried to produce a powdery granule composition. These methods, however, are capable of producing only granules having poor cohesive properties making the product highly prone to disintegration due to abrasion.

In view of the substantial practical and economic disadvantages associated with granules produced by known methods, a need has thus arisen in the art for a granular dye composition such as that produced in accordance with the present invention.

OPERATION

With a purified solution of FD&C dye as a starting material, the basic approach to creating dustless, FD&C dye granules begins with a conventional spray-drying operation in which the solution is atomized using either nozzle or spinning disc technology as conventionally known.

This preliminary spray-drying operation produces a powdered dye preferably having a residual moisture content of about 5–15% by weight.

The spray-dried FD&C powder is next mixed with water by conventional mixing techniques such as in a jacketed ribbon blender. Water is added to the powder in an amount sufficient to increase total water content to approximately 15–30% of the mixture by weight. The preferred respective ratio of powder to water in the mixture is about 18–22% by weight. To ensure uniform blending of the water and the dye, the mixture is blended, preferably for a period of up to 30 minutes. While it is not a required step in the invention, it is preferable that the mixture be allowed to stand for between 2–24 hours following mixing. During this time, it is believed that a more uniform dispersion of the water within the powder occurs.

The relative water and powdered dye composition of the mixture is critical. This is because the invention utilizes the lower moisture requirements characteristic of high pressure extrusion efficiently while maintaining the lower operating temperatures characteristic of low pressure extrusion. The result is an effective and highly efficient process.

The addition of water to the spray-dried dye facilitates extrusion. Without the addition of sufficient moisture to the powdered dye, an extrudable mixture could not be created. However, excess moisture in the mixture results in an extruded product lacking the requisite degree of cohesive properties. These cohesive properties relate to the high integrity of the extrudate and are believed to account for its abrasion resistance. Thus, an extruded product made from a mixture of spray-dried dye and even a small degree of excess moisture has been found to result in the costly requirement of lengthy, post-extrusion drying which can make the entire procedure cost prohibitive. More importantly, however, an extruded product containing excess moisture will lack the desirable cohesive properties characteristic of the extrudate produced by the present invention.

Obversely, the addition of insufficient moisture to the spray-dried dye results in a mixture that requires greatly increased extruder pressures and higher operating temperatures which have been observed to cause decomposition of the dye and destruction of the product for its intended purpose.

Extrusion of the water-dye mixture is further facilitated by an optional, albeit preferred, pre-heating operation in which the mixture is heated to approximately 40°–60° C. (100°–140° F.). The preferred temperature is about 50° C. (about 120° F.).

This heating step is conveniently carried out in the jacketed ribbon blender following the mixing operation and the preferred subsequent standing period of between 2–24 hours.

The pre-heated, low-moisture mixture is extruded unexpectedly in a characteristically low pressure extrusion (i.e. 5000 psi. and below) apparatus 10 as representatively shown in FIG. 1. Cooling occurs automatically when the mixture is fed into the extruder although friction tends to raise the temperature during the extrusion. It is desirable, however, that the mixture temperature be maintained within the range 40°– 60° C. (104°–140° F.) during extrusion. Conventional extrusion cooling/heating means are employed to maintain the mixture temperature within the desired range.

An apparatus of the type generally shown as in FIG. 1 conventionally comprises: a feed hopper 12; a motor 14; a gear drive 16; an internal extruder screw 18; and an extrusion die 20.

The apparatus 10 is operated conventionally by feeding the spray-dried mixture into hopper 12 whereby it is deposited into the region of the extruder screw 18 which rotates at a variable rate in conjunction with a motor 14 and gear assembly 16. The extruder screw 18 channels the mixture in the direction of the die 20 and, by virtue of the pressure created within the extruder, forces the mixture through the die 20 to form discrete strands of substantially dry (i.e. approximate moisture content following extrusion is 18% by wt.), granular dye product.

Figure 3:
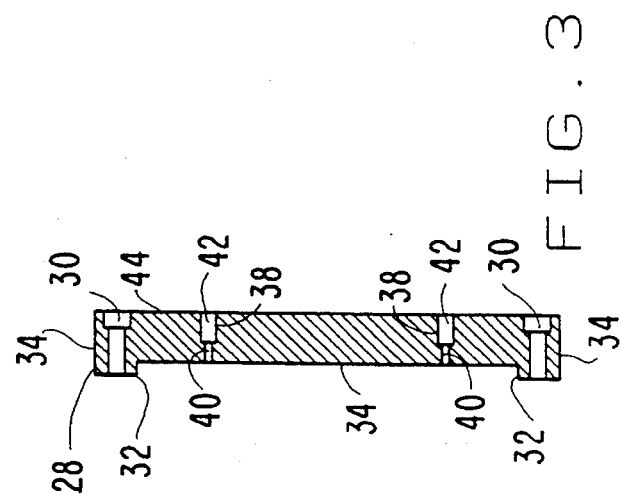
FIG. 3 is a cross-sectional view of an extrusion die such as is used in the present invention taken along line 3—3 of FIG. 2.
Figure 2:
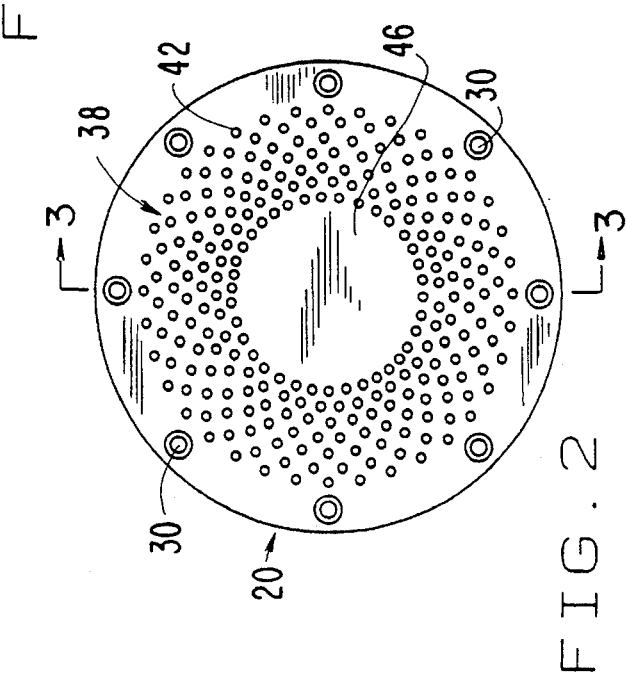
FIG. 2 is a plan view, as viewed along line 2—2 in FIG. 1, of an extrusion die such as is used in the present invention.

The die 20 utilized by the present invention is made preferably of carbon or stainless steel and may be coated with polytetrafluoroethylene. It is also specially configured, as best shown in FIGS. 2 and 3, to function effectively in conjunction with the low-moisture mixture under conditions of unexpectedly low pressure and temperature. In particular, the die 20 is generally circular and has an outside diameter of between 2–6 inches (about 50–150 mm) and, preferably, about 4 inches (about 100 mm). This diameter is equal to the outside diameter of the generally circular exterior side 22 of the extruder throat 24. The width of the circular exterior surface of the die 26 is less than 1 inch (about 25 mm) and, preferably, about 0.625 inches (about 16 mm).

The interior side of the die 28, as best shown in FIG. 3, flush mounts to the extruder throat 24 conventionally as by a plurality of mounting bolts (not shown) which are received into a plurality of counter-sunk bores 30 as clearly shown in FIGS. 2 and 3. The counter-sunk bores 30 are approximately evenly spaced annularly about the perimeter of the die 20.

An additional component of the interior side of the die 28 is a necked-down section 32 forming an annular interior surface 34 having an interior diameter equal to the interior diameter of the generally circular interior side 36 of the extruder throat 24. The necked-down section 32 is preferably bored to a depth of about 0.125 inches (about 3 mm) as measured from the interior side 28 of the die 20.

The annular surface 34 is that interior aspect of the die 20 through which the mixture is extruded. Disposed within this surface and bored therethrough are a plurality of relief-bored circular die holes 38, preferably numbering about 1500, each having an interior opening 40 and an exterior opening 42. As depicted in FIG. 2, the die holes 38 are generally configured in a circular pattern and equally spaced apart one from another. Preferably, the diameter of the interior opening 40 is about 0.04 inches (about 1 mm) while the diameter of the outside opening 42 is preferably about 0.05 inches (i.e. 1.2 mm). In addition, the die holes 38 are preferably spaced approximately 0.08 inches (about 2 mm) apart as measured from the center of one hole to the center of an adjacent hole. As can also be seen in FIG. 2, no holes are drilled in the circular center region 46 of the die 20. This area corresponds in diameter to the diameter of the face (not shown) of the shaft 48 of the extruder screw 18.

The relative lengths of the die openings 40 and 42 has been observed to be significant. For example, and as depicted clearly in cross-sectional FIG. 3, the relative depths to which each of the interior 40 and exterior 42 openings is bored has preferably been observed to be in a ratio of about 2:3. More specifically, it has been observed that, in conjunction with the other specified extrusion features thus discussed, the interior openings 40 having a diameter of about 0.04 inches (about 1 mm) are preferably bored to a depth of about 0.2 inches (about 5 mm) as measured from the interior annular surface 34. The exterior openings 42 are bored to a preferable depth of about 0.3 inches (about 8 mm) as measured from the flat exterior die surface 44. While the invention has been reduced to practice in an apparatus having a relatively small diameter throat (i.e. approximately 4 inches (about 102 mm)), it is believed that the invention may also be carried out in accordance with the principles described herein in apparatus of different dimensions without undue experimentation.

Following extrusion, the granular product having an approximate diameter of 0.04 inches (about 1 mm) is collected in strands. The residual moisture content of this product is about 18%. In order to reduce this level, oven drying is recommended at a temperature of between about 200°–275° F. (about 90°–130° C.), and preferably at about 250°–275° F. (about 120°–130° C.), for a period of between 2–24 hours. Oven drying accelerates the creation of a finished product having a low moisture content. It is an optional procedure, however, as the moisture level of the granular product will decrease naturally if simply left to stand under ambient conditions.

The final aspect of the present invention involves the vibration screen sifting of the product to achieve a finished product of highly desirable physical character. This procedure reduces the length of the elongate strands produced by extrusion to small granules of approximately uniform length and a diameter of about 0.039 inches (1 mm). These granules dissolve readily when prepared for use and they package economically. Due to the abrasion-resistant character of the granules produced by this invention, the granules remain substantially intact once packaged and up until use.

EXAMPLE 1

A 1000 lb. batch of Red 40 was synthesized and purified. The purified solution was then spray-dried to produce a dyestuff powder having a moisture content of about 2–5%. 350 lbs. of the spray-dried Red 40 was loaded into a ribbon blender and mixed with 87.5 lbs. of water for 30 minutes. The mixture was allowed to stand for a period of approximately 2 hours and gradually heated until a temperature of approximately 50° C. was achieved. The mixture was then fed into a 4" single screw extruder. The extruder was equipped with a hardened steel die approximately 4 inches in diameter having approximately 1500 borings therethrough in a substantially circular pattern. The individual borings were relief-drilled in the manner and dimensions as described above with the diameter and drilled depth of the outside borings being slightly larger than these corresponding features of the inside borings.

The speed of the extruder screw was adjusted to approximately 40 rpm's and pressure was maintained at between 3000–5000 psi. The mixture was processed through the extruder die at a temperature of about 50° C. and collected as stranded granular product. Product moisture, following extrusion, measured about 18%. This level was then reduced to a total moisture content of about 4–6% by drying the product in an oven for approximately 6 hrs. at 220° F.

Finally, the extruded product having a diameter of about 0.039 inches (1 mm) was vibration sifted through a screen sifter to form small granules of approximate uniform length. This operation accomplished at least two significant objectives. First, small granules dissolve more readily than would the strand that results from extrusion. This is important to consumers of FD&C dyes because the greater the time and energy that is required to dissolve the dye, the more expensive it is to them to utilize the dye. Second, obvious benefits relating to the handling, costs of transportation and the metering of the product for use also favor small granules.

A sample of the product produced in accordance with the present invention was submitted to the FDA and subsequently certified for use in foods, drugs and cosmetics.

This process was then successfully repeated in its entirety and with no significant modification for the following FD&C dyes: Yellow 5; Yellow 6; Blue 1; Blue 2 and Red 3.

As described in detail above, the present invention offers substantial advantages over the current state of the art of producing dry FD&C dyes. In particular, the dustless and abrasion-resistant character of the granular product so made is attributable to the cohesive properties of the dye mixture when extruded. The result is a granular product of superior handling character.

A substantially reduced cost of production due both to a reduction in the amount of moisture required for extrusion and a processing efficiency of over 97% also constitute important features of the present invention.

While the present invention has been described by reference to a specific embodiment, it should be understood that modifications and variations of the invention may be constructed without departing from the scope of the invention defined in the following claims.

What is claimed is:

1. A method for producing granular FD&C dyes comprising the steps of:

drying a solution of FD&C dye to produce a powder;

combining said powder with water in a relative weight percentage amount sufficient to form an extrudable mixture;

extruding said mixture to produce a stranded dye product; and sifting said stranded dye product to produce a granular dye product.

2. The method of claim 1, further comprising the step of heating the mixture to about 40° C. to about 60° C. prior to extrusion.

3. The method of claim 2, wherein said mixture is comprised of approximately 15% by weight to approximately 25% by weight water.

4. The method of claim 1, further comprising the step of drying said product.

5. The method of claim 3, further comprising the step of drying said product.

6. The method of claim 2, wherein said powder and said water are combined in a respective ratio of about 4:1 by weight and further comprising the step of drying said product.

7. A method for producing FD&C dyes in strands comprising:

introducing an FD&C dye mixture into an extruder having a housing with an inlet and an outlet;

extruding said dye mixture through said housing and out of said extruder through a perforated die having a plurality of passageways, each of the passageways having an entry bore and an exit bore in communication therewith, the die being supported within said housing and each of said entry bores having a first diameter and each of said exit bores having a second diameter such that the ratio of the second diameter to the first diameter is about 1.2; and recovering an extruded product from said extruder.

8. The method of claim 7, wherein the die has a thickness extending from a first side of the die to a second side of the die of about 0.625 inches and the passageways extend from the first side of the die to the second side of the die such that each of the entry bores extends from the first side of the die into the die for a first depth and each of the exit bores extends from the second side of the die into the die for a second depth such that the ratio of the first depth to the second depth is about 2:3.

9. The method of claim 8, wherein said first depth is about 0.2 inches and said second depth is about 0.3 inches.

10. The method of claim 7, wherein said perforated die has a necked-down section forming an annular interior surface having an interior diameter equal to the interior diameter of said housing.

11. The method of claim 9, wherein said perforated die has a necked-down section forming an annular interior surface having en interior diameter equal to the interior diameter of said housing.

12. The method of claim 7, wherein said FD&C dye mixture comprises a combination of FD&C powder and water in relative weight percentages of about 4:1 and wherein said mixture is heated to about 40° C. to about 60° C. prior to extrusion.

13. The method of claim 12, wherein the amount of said water in said mixture is about 15% by weight to approximately 25% by weight.

14. A method for producing granular FD&C dyes in strands comprising:

introducing an FD&C dye mixture into an extruder having a housing with an inlet and an outlet;

extruding said dye mixture through said housing and out of said extruder through a perforated die having a plurality of passageways, each of the passageways having an entry bore and an exit bore in communication therewith, the die being supported within said housing and each of said entry bores having a first diameter and each of said exit bores having a second diameter such that the ratio of the second diameter to the first diameter is about 1.2;

recovering an extruded product from said extruder; and drying said product.

15. The method of claim 14, wherein the die has a thickness extending from a first side of the die to a second side of the die of about 0.625 inches and the passageways extend from the first side of the die to the second side of the die such that each of the entry bores extends from the first side of the die into the die for a first depth and each of the exit bores extends from the second side of the die into the die for a second depth such that the ratio of the first depth to the second depth is about 2:3.

16. The method of claim 14, wherein said first depth is about 0.2 inches and said second depth is about 0.3 inches.

17. The method of claim 14, wherein said perforated die has a necked-down section forming an annular interior surface having an interior diameter equal to the interior diameter of said housing.

18. The method of claim 16, wherein said perforated die has a necked-down section forming an annular interior surface having an interior diameter equal to the interior diameter of said housing.

19. The method of claim 14, wherein said FD&C dye mixture comprises a combination of FD&C powder and water in relative weight percentages of about 4:1 and wherein said mixture is heated to about 40° C. to about 60° C. prior to extrusion.

20. The method of claim 19, wherein the amount of said water in said mixture is about 15% by weight to approximately 25% by weight.

21. The method of claim 12, wherein said product is dried following recovery.

* * * * *

UNITED STATES PATENT AND TRADEMARK OFFICE
CERTIFICATE OF CORRECTION

PATENT NO. : 5,507,991
DATED : April 16, 1996
INVENTOR(S) : John R. Mudd

It is certified that error appears in the above-indentified patent and that said Letters Patent is hereby corrected as shown below:

In column 9, line 16: change "en" to --an--.

In column 9, line 26: delete "granular".

Signed and Sealed this

Twenty-ninth Day of October 1996

Attest:

BRUCE LEHMAN

*Attesting Officer*    *Commissioner of Patents and Trademarks*